United States Patent [19]

Meinunger

[11] 4,340,198
[45] Jul. 20, 1982

[54] STAND FOR A PROJECTION SCREEN

[75] Inventor: Helmut Meinunger, Radevormwald, Fed. Rep. of Germany

[73] Assignee: Mechanische Weberei GmbH, Bad Lippspringe, Fed. Rep. of Germany

[21] Appl. No.: 148,123

[22] Filed: May 9, 1980

[30] Foreign Application Priority Data

May 11, 1979 [DE] Fed. Rep. of Germany ....... 2919170

[51] Int. Cl.³ .............................................. B61L 25/00
[52] U.S. Cl. .................................. 248/122; 248/225.1
[58] Field of Search ...................... 248/122, 225.1, 291

[56] References Cited

U.S. PATENT DOCUMENTS 1,073,477  9/1913  Dietz ........................... 248/225.1 X
2,763,453  9/1956  Palino .......................... 248/122 X
3,389,883  6/1968  Johnson ........................ 248/225.1 X Primary Examiner—Wayne L. Shedd
Attorney, Agent, or Firm—Karl F. Ross

[57] ABSTRACT

A projection screen stand has a post which normally can be supported in an upright position, e.g. by legs in a tripod arrangement, and provided with a holder for a tube which receives the screen and from which the screen can be withdrawn. According to the invention, the holder has a dovetail recess or slot and the tube has a complementary fitting or tenon receivable in this recess and designed to enable the tube to be withdrawn readily from the holder and used independently of the post.

6 Claims, 2 Drawing Figures

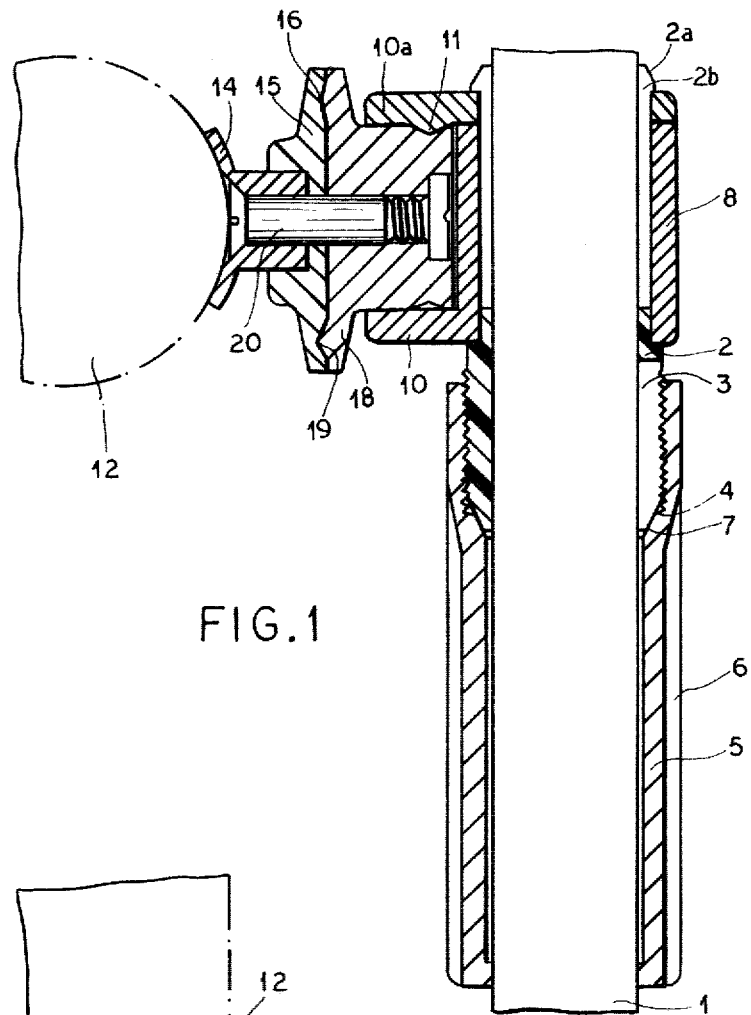
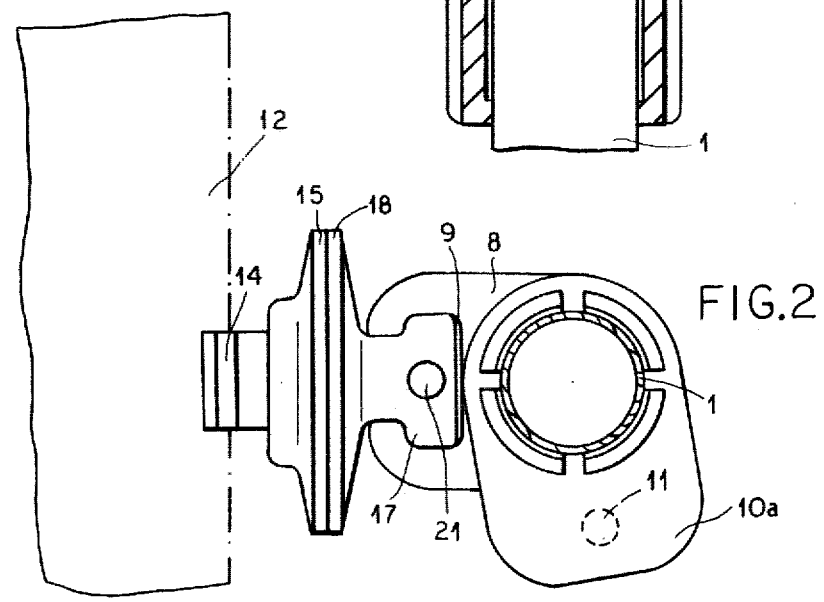

4,340,198

STAND FOR A PROJECTION SCREEN

FIELD OF THE INVENTION

My present invention relates to a portable projection or display screens and, more particularly, to a projection screen of the portable type provided with a post. The invention is especially pertinent to the attachment of a projection screen housing to such a post.

BACKGROUND OF THE INVENTION

Projection screens for home, commercial or industrial purposes and various other rollable materials such as display charts may be provided in a tubular housing hereinafter referred to as a tube, having an axially extending slot through which the screen can emerge and provided internally with means enabling the screen to be wound up upon a rod or core within the tube.

For use, a member attached to the screen can be tugged by the user to withdraw the screen against the spring force of the rollup device and extend the screen to its full height.

When the use is terminated, the screen may be allowed to reel into the tube which protects the screen and forms a compact package therefor.

Such screens are generally associated with a post to which the tube is connected by a stirrup-shaped holder forming a handgrip and attached to the tube by a screw.

The post itself may be telescopically extensible and/or provided with legs, e.g. in a tripod arrangement so that the assembly may be freestanding.

The holder, as described, generally permits rotation of the tube about the axis of the screen so that, when the screen is in use, the tube lies horizontally and transverse to the post which is held in its upright position by the legs. However, once the screen has been rolled up into the tube and it is desired to store and transport the assembly, the tube can be swung about the axis of the screw until it lies parallel to the post.

This system has a disadvantage in that the connection of the tube to the post to enable the displacement of the tube between its operative and inoperative positions, requires that the tube always accompany the post and vice versa. In other words, the tube and the screen contained therein can only be utilized in conjunction with the post.

This disadvantage of course, means that it is impossible to readily utilize the screen in conditions in which a post may be impractical or unusable. Of perhaps greater importance, however, is the fact that the tube and screen on the one hand and the post, tripod and like elements on the other may be relatively heavy especially for higher quality screens and their supports, so that the assembly can only be transported by strong individuals, e.e. the tube cannot be removed from the post assembly to enable these two parts to be carried separately, e.g. by different individuals. Obviously this is a considerable handicap for smaller or less strong individuals.

OBJECTS OF THE INVENTION

It is the principal object of the present invention, therefore, to provide a projection screen assembly which will obviate the aforementioned disadvantages and, more particularly, which will permit independent use of the screen and post assemblies.

Another object of the invention is to provide a more versatile projection screen device obviating disadvantages of prior art systems.

SUMMARY OF THE INVENTION

These objects and others which will become apparent hereinafter are obtained in accordance with the present invention in a projection screen device having the aforementioned screen-containing tube with its rollup means, a post which may be telescopically examinable and which also can be provided with legs or a tripod for holding the post in an erect position, and a holder for connecting the post to the tube which is formed with an undercut recess advantageously of dovetail-like configuration, into which the head of a fastening member of the tube can be removably fitted. The screen can thus be readily withdrawn from the dovetail slot of the holder and transported separately from the post and even used separately. The term "dovetail-like" is here used for undercut mortise-and-tenon connections which are flared or stepped and can be of the T-slot or true dovetail shape.

According to a feature of the invention, the holder is provided with a coverplate swingable about the axis of the post and adapted to cover the recess so that the aforementioned member cannot be withdrawn from the recess or slot until this cover is swung aside.

The cover, which advantageously has a detent engageable with the aforementioned member of the tube to limit its swinging movement out of the path of this member, thus prevents undesired dislodgment of the member from the recess and separation of the tube from the post.

To facilitate rotation of the tube about an axis perpendicular to both the tube and the post, the fastening member of the tube is provided with two confronting disc-shaped elements, one of which is anchored to the tube while the other is anchored to the head which is receivable in the recess and which are connected by a bolt defining the pivot axis.

At least one of these elements on its surface confronting the other is provided with a bump or projection which can index selectively into one of two recesses at the same radial distance from the bolt axis on the confronting surface of the other element, the two recesses being angularly offset by substantially 90° and corresponding to positions in which the tube lies transversely to the post and parallel thereto respectively.

It has been found to be advantageous to form the first element with four such bumps or projections equally spaced at 90° about the axis of the bolt and four correspondingly spaced recesses of the other element.

It has also been found to be advantageous not to provide the holder on a stirrup-shaped handgrip but rather to mount it upon a slotted sleeve coaxial with the post and whose lower end is formed with an external thread terminating at a frustoconical surface.

A locking sleeve can then also surround the tube and can be provided with a female thread engageable with the male thread portion of the slotted sleeve and having a complementary frustoconical portion engaging the portion of the slide sleeve to clamp the latter against the post. This device can be used to adjust the position of the holder along the post and of course the holder angularly and axially to the post while having a particularly aesthetic appearance and being particularly easily manipulated.

BRIEF DESCRIPTION OF THE DRAWING

The above and other objects, features and advantages of the present invention will become more readily apparent from the following description, reference being made to the accompanying drawing in which:

FIG. 1 is a longitudinal section through a post and holder, according to the invention, the support tripod and telescoping post arrangement having been omitted and the screen tube shown only in dot-dash lines; and FIG. 2 is a plan view of this device.

SPECIFIC DESCRIPTION

The post 1, in the form of a telescoping tube, mounted on a tripod not shown, is provided with a slotted sleeve 2 which is advantageously composed of synthetic resin and is provided at its lower end with a male thread 3 terminating in a frustoconical surface 4.

The thread 3 can be received in the female threaded clamping sleeve 5 which is cylindrical and is provided along its exterior with grooves 6 to provide a ribbed appearance and facilitate rotation of the sleeve 5.

The sleeve 5 is provided with an internal frustoconical surface 7 which is complementary to the surface 4 and thus can wedge the latter against the post as the sleeve 5 is tightened.

The sleeve 2 is provided with a holder 8 between shoulders of the sleeve 2, the holder 8 having a cylindrical bore which snugly receives the sleeve.

On one side, the holder 8 is provided with an undercut recess 9 which is of dovetail-like cross section (here a T-slot) and is closed at its bottom by the extension 10 of the holder.

At the upper end of this recess, the closure plate 10a is swingable about the sleeve 2 and hence the post, to close the recess 9. In FIG. 2 the cover plate is shown to be swung away to allow the head 17 to be withdrawn from the recess.

The underside of the closure plate 10a has a downwardly extending bulge or projection 11 which is engageable in the recess 21 of head 17 whereby the cover is indexed in its slot-closing position.

The tubular housing 12 or the projection screen has a fastening member 14 which is rigid with a plate or disk element 15 formed with four recesses 16 angularly offset from one another by 90° about the axis of a bolt 20.

The head 17, which is also of dovetail-like (T-slot) profile so that it can be slid into and out of the recess 9, is formed unitarily with an opposing plate element 18 whose face confronting that of element 15 is formed with four angularly equally spaced bulges 19 which can index in the recess 16.

The bolt 20 holds the elements 15 and 18 together.

The holder 8 and the cover 10a can be used mounted upon the sleeve 2 by threading the upper end of the sleeve through these elements. For this purpose, the upper end of the sleeve is bevelled at 2a to allow the shoulder 2b to be cammed inwardly during this operation prior to mounting the sleeve 2 on the post 1.

The assembly can be shifted along the post by loosening the sleeve 5 and retightening it at the appropriate location.

When the projection screen 12 is to be rotated from its used position shown into a position parallel to the post 1, the tube 12 is simply rotated and the elastic element 15 is cammed to the left to permit the projection 19 to clear the recesses and again jump into recesses upon rotation of a screen through the right angle.

When the screen is to be separated from the post, the cover 10a is swung aside and the tube 12 with its head 17 is withdrawn from the recess 9.

I claim:

1. A projection screen assembly which comprises:
  a post;
  a holder mounted on said post and formed with a dovetail-like slot;
  a head of generally dovetail-like profile removably receivable in said slot; and
  a projection screen tube mounted on said head whereby said tube can be removed with said head from said post, said holder being mounted on a slotted sleeve, said slotted sleeve being provided with a male thread at one end having a frustoconical portion at said end, said assembly further comprising a locking sleeve having a female thread engageable with said male thread and a frustoconical portion adapted to clamp said slotted sleeve against said post, said sleeve surrounding said post and being slidable with said holders thereon.

2. A projection screen assembly which comprises:
  a post;
  a holder mounted on said post and formed with a dovetail-like slot;
  a head of generally dovetail-like profile removably receivable in said slot; and
  a projection screen tube mounted on said head whereby said tube can be removed with said head from said post, said holder being formed with a cover swingable about the axis of said post for blocking said recess to prevent inadvertent withdrawal of said head from said recess.

3. The assembly defined in claim 2 wherein said cover is formed on its surface turned toward said recess with a projection and said head is formed with a recess for receiving said projection and indexing said cover in a closed position.

4. The assembly defined in claim 3 wherein said head is provided with a pair of confronting disc-shaped elements, one of which is connected to said tube and the other of which is connected to a T-slot portion of said head and a bolt connecting said elements for relative rotation about the axis of said bolt.

5. The assembly defined in claim 4 wherein one of the elements is provided with a bolt and the other of the elements is formed with at least two recesses angularly spaced about the axis of said bolt by 90° for receiving the bulge of said one of said elements and indexing said tube selectively in a position in which said tube lies transverse to said post and in a position in which said tube lies parallel to said post.

6. The assembly defined in claim 2, claim 3, claim 4 or claim 5 wherein said holder being mounted on a slotted sleeve, said slotted sleeve being provided with a male thread at one end and having a frustoconical portion at said end, said assembly further comprising a locking sleeve having a female thread engageable with said male thread and a frustoconical portion adapted to clamp said slotted sleeve against said post, said sleeve surrounding said post and being slidable with said holders thereon.

* * * * *